March 25, 1958  B. VOUMARD  2,827,758
SHOCK-ABSORBING BEARING
Filed Oct. 1, 1952  2 Sheets-Sheet 1
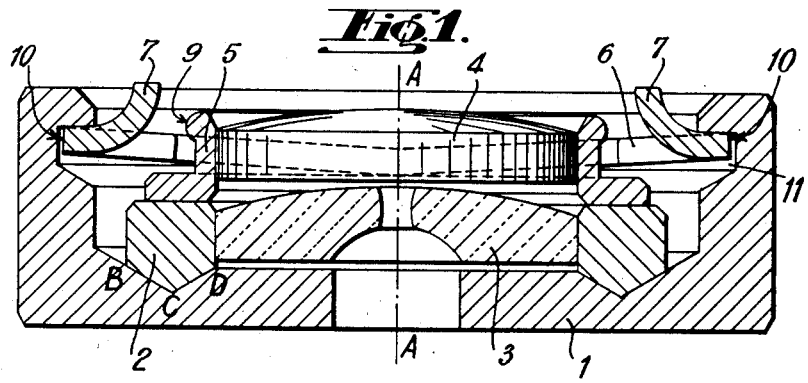
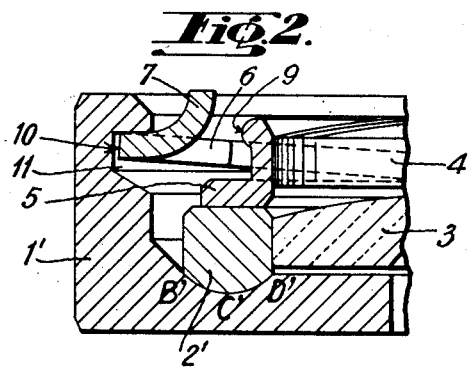
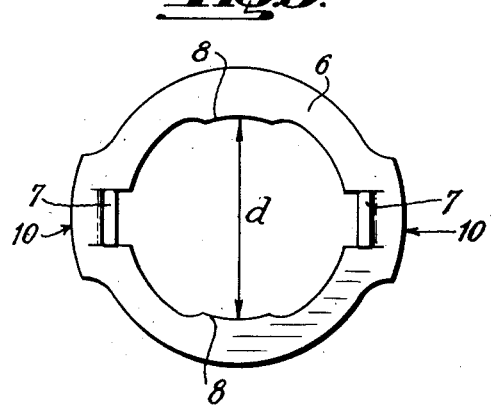
INVENTOR
BERTRAND VOUMARD
BY
Haseltine, Lake & Co.
AGENTS March 25, 1958  B. VOUMARD  2,827,758
SHOCK-ABSORBING BEARING
Filed Oct. 1, 1952  2 Sheets-Sheet 2
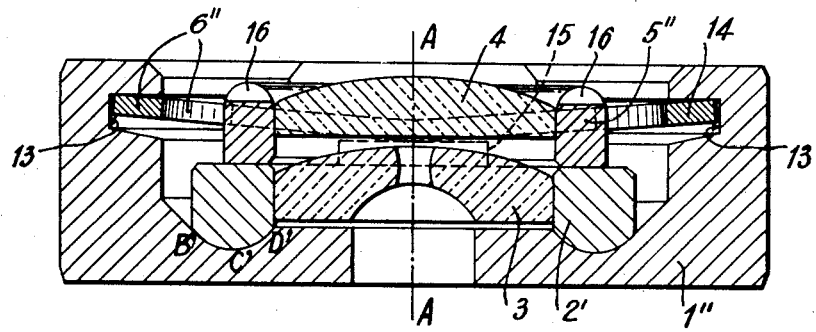
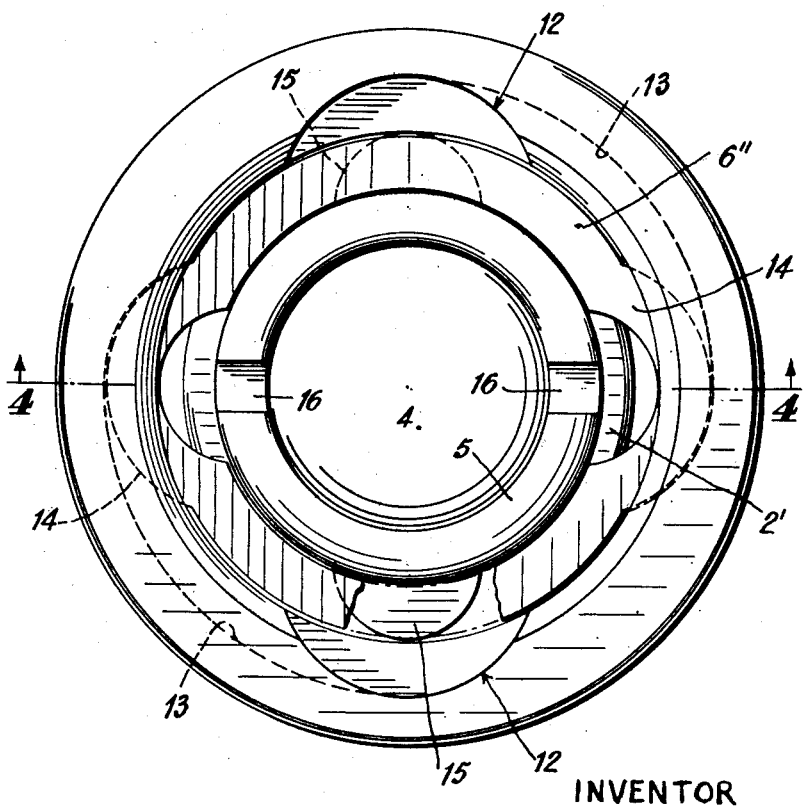
INVENTOR
BERTRAND VOUMARD
BY
Haseltine, Lake & Co.
AGENTS

United States Patent Office 2,827,758
Patented Mar. 25, 1958

2,827,758

SHOCK-ABSORBING BEARING

Bertrand Voumard, La Chaux-de-Fonds, Switzerland

Application October 1, 1952, Serial No. 312,595

Claims priority, application Switzerland
November 7, 1951

6 Claims. (Cl. 58—140)

The invention concerns a shock-absorbing bearing, principally but not exclusively for the axle of the balance wheel of a watch, and comprising a bush lodged in the body of the bearing and capable of being displaced in any direction, under the influence of a shock, against the action of an elastic member.

According to the invention, the surface of contact between the bush and the body of the bearing is a surface of revolution around the axis of the bearing and the generating line of which comprises an inclined flank, the said surface guiding the movements of the bush and ensuring the correct centering of the axle, an independent support being provided for an end stone, the said support being pressed against the bush by means of the said elastic member, the general shape of which is that of a ring acting as a pair of beam springs each of which co-operates at both ends with the body of the bearing and acts on the said support by its middle portion, the bush, the end stone support and the body of the bearing forming a whole which is maintained assembled by the said elastic member.

The acompanying drawings show two examples of the bearing according to the invention.

Fig. 1 is a large scale axial cross-section of the first example.

Fig. 2 shows part of an axial cross-section of a variant.

Fig. 3 is a top view, to a smaller scale, of a detail.

Fig. 4 is a cross-section along 4—4 of Fig. 5 of a second example; and

Fig. 5 shows a top view of the second example.

The shock-absorbing bearing shown in Figs. 1 and 4 is destined for the axle of the balance wheel of a watch and comprises a body 1 in which is lodged a bearing bush constituted by a setting ring 2 carrying a pierced stone 3. An end stone 4 is set in a support constituted by an independent setting ring 5 which is pressed against the setting ring 2 by means of an elastic member, as will be described later on.

The surface of contact between the setting ring 2 and the body 1 of the bearing is a surface of revolution around the axis A—A of the bearing. The generating line B, C, D of this surface of revolution comprises two flanks B C and C D of opposite inclinations, that is, forming a V the angle of which is obtuse. Instead of two flanks of opposite inclination, use might be made of a single inclined flank, that is of a single centering cone.

In the variant shown in Fig. 2 the generating line B', C', D' of the contact surface between setting ring 2' and body 1' comprises two arched flanks B' C' and C' D'.

The elastic member is constituted by an elastic ring 6, shown in Fig. 3, and comprising two diametrically opposed holding lugs 7 formed in the projecting parts 10. These lugs 7 enable the ring 6 to be placed in the body 1 of the bearing or to be removed. Two diametrically opposed projecting parts 8, situated at 90° from the lugs 7, are also provided, and they are destined to grip the setting ring 5, the inner diameter d between these projecting parts being slightly less than the outer diameter of the setting ring 5. In order that the elastic ring 6 may be better kept in place, the setting ring 5 is provided with a rounded bead 9.

In order to assemble the bearing, the setting ring 2 with the pierced stone 3 is first placed in the body 1 of the bearing. The setting ring 5, with or without the elastic ring 6, is then placed on the setting ring 2. One of the projecting parts 10 of the elastic ring is inserted, through a notch (which is not visible in the drawing) in the body 1 of the bearing, in the annular groove 11. The elastic ring 6 is then rotated through 180°, either by means of the lug 7 or by means of a notch (which is not shown) provided near the projecting part 10.

In this manner the second projecting part 10 of the elastic ring is brought exactly above the notch in the body of the bearing. The elastic ring is then pushed down so that its projecting part 10 passes through the notch and comes to rest in the annular groove 11, after which the elastic ring is given a quarter turn. The said elastic ring is thus set and holds together the assembly formed by the body of the bearing and the two setting rings. The elastic ring acts as a pair of beam springs each of which co-operates at both ends with the body 1 of the bearing and acts on the end stone support 5 by its middle portion.

In the example shown in Figs. 4 and 5 the body 1" of the bearing is provided with notches 12 leading to grooves 13 destined to receive lugs 14 provided on the elastic ring 6". The inner diameter of this ring is slightly larger than the outer diameter of the setting ring 5", which is constituted by a cylindrical body the base of which is provided with two diametrically opposed lugs 15. Diametrically opposed slots 16 are cut in the upper edge of the cylindrical body in order to facilitate the placing and removal of the setting ring 5".

The bearing described is assembled in the following manner:

First of all the setting ring 2' is placed in the body 1" of the bearing. The elastic ring 6" is then mounted by inserting the lugs 14 in the notches 12 and then giving the ring a quarter turn in a clockwise direction. The end stone setting ring 5" is then brought into place by inserting the lugs 15 in the notched parts of the lugs 14 and then giving the ring 5" a quarter turn to bring it to the position shown in Fig. 5. The lugs 15 are thus brought under the elastic ring 6" and set the latter. The setting ring 5" is thus pressed against the setting ring 2' and both are held in place in the body 1 of the bearing.

An advantage of the second example described is that the end stone setting ring 5" can be removed for cleaning and oiling without the elastic ring 6" having to be removed.

In both the examples described, a shock coming from the side would momentarily displace the setting ring 2 or 2', together with the setting ring 5 or 5", in relation to the body 1, 1' or 1", of the bearing, against the action of the elastic ring 6, the latter bringing the setting ring 2' back to its initial position after the shock; the contact surface, thanks to the flanks of the generating line B C D (respectively B', C', D') guides the displacement of the bush and ensures the correct recentering of the axis A—A of the bearing.

The setting ring 5" could also be moved independently of the setting ring 2' under the action of an axial shock, for instance.

What I claim is:

1. A shock-absorbing self-centering bearing, particularly for supporting an axle of a watch movement; said bearing comprising a body having an annular recess therein; a bush loosely lodged in said recess for displacement relative to said body in any direction in response to the imposition of a shock against said body, means on said bush and body operative to recenter said bush with respect to said recess following the displacement of the bush, an independent support ring for an end stone fitting in said recess above said bush, said recess having an inwardly opening annular groove in the peripheral surface thereof, a bowed substantially circular spring member fitting into said recess loosely around said support ring and having diametrically opposed lugs extending radially outward therefrom to engage in said groove and notches on its inner periphery, and lugs on said support ring engaging under portions of said bowed spring member between said notches in a predetermined rotated position of said support ring relative to said spring member to set the latter so that said spring member then holds said support ring against said bush to maintain said recentering means on said bush and body in cooperative engagement, the lugs on said support ring being free to pass through the notches of said spring member in another rotated position thereof to permit insertion and removal of said support ring independent of removal of said member.

2. A shock-absorbing bearing according to claim 1; wherein said body has spaced notches opening radially inward and into said groove to receive said lugs on the spring member during the insertion and removal of the latter.

3. A shock-absorbing bearing according to claim 1; wherein the notches in said circular spring member are diametrically opposed and radially aligned with the lugs on said member, and the lugs on the support ring are diametrically disposed thereon and registering with said notches of the spring member in said other rotated position and passing through said notches during the insertion and removal of said support ring.

4. A shock-absorbing bearing according to claim 1; wherein said recentering means includes nesting annular surfaces on said body and bush having obtusely V-shaped cross-sections.

5. A shock-absorbing bearing according to claim 1; wherein said recentering means includes nesting annular surfaces on said body and bush having arcuate cross-sections including oppositely arched portions.

6. A shock-absorbing bearing as claimed in claim 1; comprising an end stone supported in said independent support ring and being recentered by operation of said support ring and said bowed spring member after shock.

References Cited in the file of this patent

UNITED STATES PATENTS

| 1,236,175 | Hopewell | Aug. 7, 1917 |

FOREIGN PATENTS

| 183,386 | Switzerland | July 1, 1936 |
| 232,946 | Switzerland | Sept. 16, 1944 |